Nov. 26, 1963   F. W. TRUESDELL ETAL   3,112,069
RESETTING MECHANISM FOR ROTATABLE SHAFTS
Filed Feb. 28, 1961   2 Sheets-Sheet 1

Inventors,
Francis W. Truesdell,
Harold T. Faus,
by Francis X. Doyle
Their Attorney.

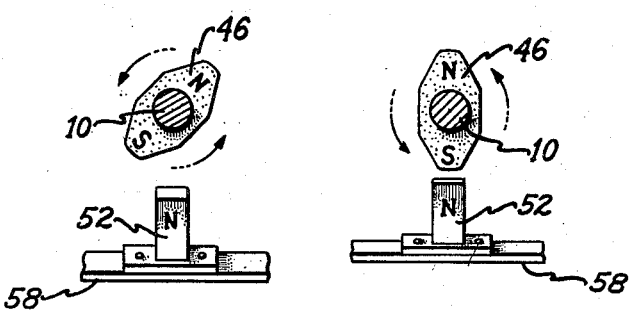
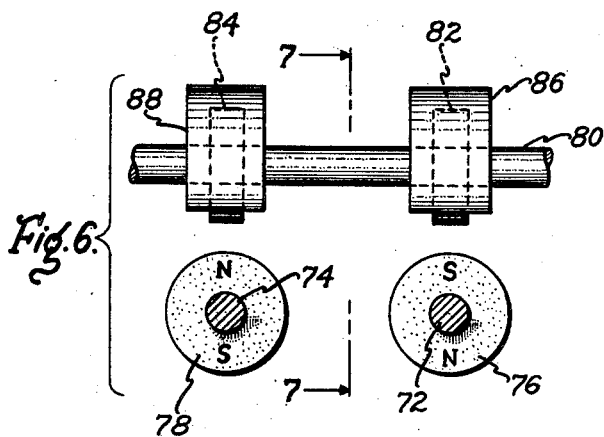

United States Patent Office 3,112,069
Patented Nov. 26, 1963

3,112,069
RESETTING MECHANISM FOR ROTATABLE SHAFTS
Francis W. Truesdell, Dover, N.H., and Harold T. Faus, Lynn, Mass., assignors to General Electric Company, a corporation of New York
Filed Feb. 28, 1961, Ser. No. 92,340
5 Claims. (Cl. 235—144)

This invention relates to resetting mechanisms and more particularly to resetting mechanisms for rotatable shafts.

In many types of mechanical devices utilizing rotatable shafts it is desirable at some point during the operation of the device to either position or reposition a rotatable shaft to a fixed or predetermined position. In those instances where the rotatable shaft does not make a number of revolutions it is the common practice to provide a pinion on the shaft and to drive a large diameter sector gear from such pinion. The gear ratio is in general selected so that the sector gear does not move through a large angle. It is then a simple matter to reset the moving shaft to a fixed position by merely returning the sector gear to its former position. However, where a large number of rotatable shafts are utilized and where the shafts may make a large number of revolutions, it will be apparent that the pinion and sector gear is not suitable since the pinion will, in general be driven completely beyond the range of the large diameter sector gear. Another known method of repositioning a rotatable shaft is the use of a spring coupling between the rotatable shaft and the frame of the device on which it is used. On these mechanisms, a spring is affixed to the rotatable shaft with its opposite end affixed to the frame of the device such that as the rotatable shaft is rotated the spring is placed under a tension. In these mechanisms when the rotatable shaft is released from its driving means, the tension spring will return the shaft to its fixed or predetermined position. Of course, it will be obvious that where the rotatable shaft is required to make a large number of revolutions, the spring coupling device does not provide an adequate repositioning means since it will generally be ineffective beyond a very small number of revolutions.

In those devices where the rotatable shaft or shafts are required to make a large number of revolutions, it has been known to make use of a heart-shaped cam on the rotatable shaft with a radially moving follower associated therewith. However, as will be obvious to those skilled in the art, the heart-shaped cam is subjected to sliding friction between the cam and the follower and the bearing reaction of the mechanisms are many times those which are required by the simple pinion and sector rear resetting mechanisms. An additional objection to the heart-shaped cam is that there is a limited angular position when the point of the cam is aligned with the tip of the follower. In this position, the follower is unable to cause rotation of the shaft and therefore the mechanism is inoperative to provide resetting of the rotatable shaft. Another known means which has been used is the addition of offset weights to the rotatable shaft and driving mechanism such that when the rotatable shaft is released from the mechanism the force of gravity will cause such offset weights to rotate the rotatable shaft, through gravity, to its desired fixed or predetermined position. Of course, it will be obvious that the use of unbalanced weights results in a pulsating drive torque which is very undesirable in the many devices which utilize rotatable shafts. Further, as will be well understood, the use of unbalanced weights on the rotatable shaft also result in there being a limited angular position of the rotatable shaft in which the offset weights are not effective to result in the repositioning of such rotatable shaft. However, despite the obvious limitations of the above-noted, heart-shaped cam and follower device and the use of offset weights on a rotatable shaft, such devices are utilized where the rotatable shaft will make a large number of rotations since there is no better resetting mechanism available to the art.

One of the many possible devices utilizing resetting mechanisms of the nature disclosed in this application are demand meters for example, the indicating demand meter disclosed in patent application Serial No. 71,353 filed November 23, 1960, now Patent No. 3,092,318 issued June 4, 1963, in the name of Donald M. Ham and assigned to the same assignee as the present invention. In that application, there is disclosed an indicating demand meter in which a plurality of shafts are driven through a number of rotations to provide an accurate indication of the demand used during a given demand interval. At the end of the given demand interval, a resetting mechanism is utilized to reposition the rotatable shafts to a predetermined zero position. This application discloses and claims a resetting mechanism for resetting rotatable shafts which may be utilized in a device of the nature disclosed in that patent.

From the above discussion it will be apparent that in devices such as, for example, the indicating demand meter, which utilizes rotatable shafts where it is desired to position or reposition such rotatable shafts to a fixed or predetermined position, it is desirable to provide a method of repositioning which will positively and accurately return the rotating shaft to a predetermined position. It will also be apparent that there is a need in this art for a mechanism to position or reposition a variably rotatable shaft which will not introduce added friction torques to the rotatable shaft, which would thus require additional energy to be utilized during the resetting action to overcome such torques.

It is therefore an object of this invention to provide a resetting mechanism for a rotatable shaft which will not be subjected to failure to reposition when the rotatable shaft is in a limited angular position.

It is a further object of this invention to provide a resetting mechanism for resetting rotatable shafts which will not add additional friction torques to the rotatable shaft means.

A still further object of this invention is to provide a resetting mechanism which will not require the addition of offset weights to the rotatable shaft.

Another object of this invention is to provide a resetting mechanism which will provide rapid and accurate repositioning of a rotatable shaft regardless of the number of revolutions through which such rotatable shaft has been rotated.

In carrying out this invention in one form, a resetting mechanism for resetting a rotatable shaft or shafts through a fixed or predetermined position is provided. The resetting mechanism comprises a first magnetic means which is fixedly mounted on the rotatable shaft to be repositioned, a second magnetic means is provided separate from the rotatable shaft and movably mounted so as to move one pole of such second magnetic means into a position adjacent the first magnetic means. The first magnetic means is mounted on the rotatable shaft such that one of its magnetic poles is nearest to the second magnetic means when the rotatable shaft is in its desired fixed or predetermined position. By moving the second magnetic means such that its pole of opposite polarity to the one pole of the first magnetic means is moved adjacent the first magnetic means the poles of opposite polarity will be attracted to each other, thus rotating the rotatable shaft to its desired fixed or predetermined position.

The invention which it is desired to protect by this application is particularly pointed out and distinctly claimed in the claims appended hereto. However, it is believed that the objects of this invention, as well as other objects and advantages thereof, will be more clearly understood by reference to the following description when taken in connection with the accompanying drawings wherein:

FIGS. 4 and 5 are partial views showing in greater detail the operation of the magnetic means used in the preferred form of this invention;

FIG. 6 is a partial view of a shaft resetting mechanism according to a second form of this invention;

FIG. 7 is a partial view of the second embodiment taken on the line 7—7 of FIG. 6.

Figure 1:
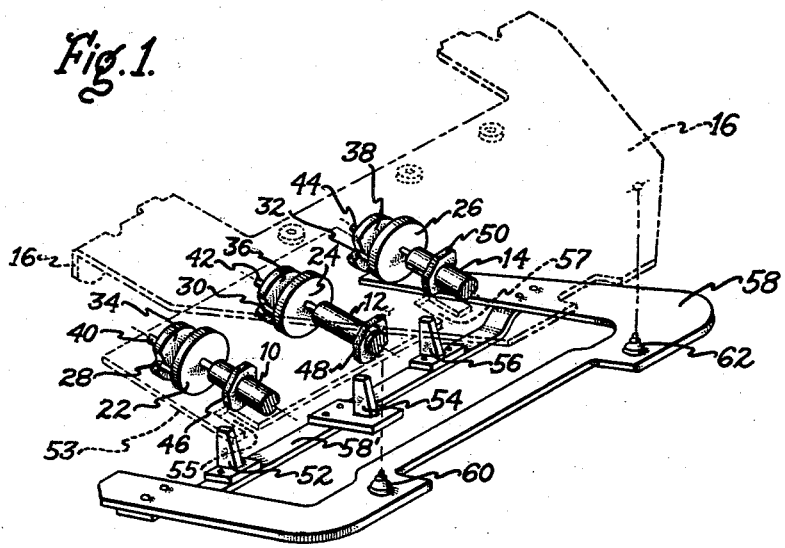
FIG. 1 is a perspective view of a preferred form of the shaft resetting mechanism of this invention.

Referring now to the drawings in which like numerals are used to indicate like parts throughout, there is shown a shaft resetting mechanism according to this invention in which a rotatable shaft is provided with a magnetic means thereon, the magnetic means being aligned with its magnetic poles in a fixed position when the rotatable shaft is in its desired fixed or predetermined position; a second magnetic means is provided movable to a position adjacent the magnetic means on the rotatable shaft, the second magnetic means being mounted such that the pole of opposite polarity to one pole of the first magnetic means on a rotatable shaft is brought into position adjacent the first magnetic means. As the second magnetic means is moved to a position adjacent the first magnetic means, the pole of the second magnetic means attracts the opposite pole of the first magnetic means on the rotatable shaft thereby causing the rotatable shaft to rotate until such magnetic pole of the first magnetic means is directly adjacent the pole of the second magnetic means. This position of the first magnetic means is the desired fixed or predetermined position of the rotatable shaft, thus the magnetic repositioning means of this invention rapidly and accurately causes the rotatable shaft to be rotated to a desired fixed or predetermined position.

Figure 2:
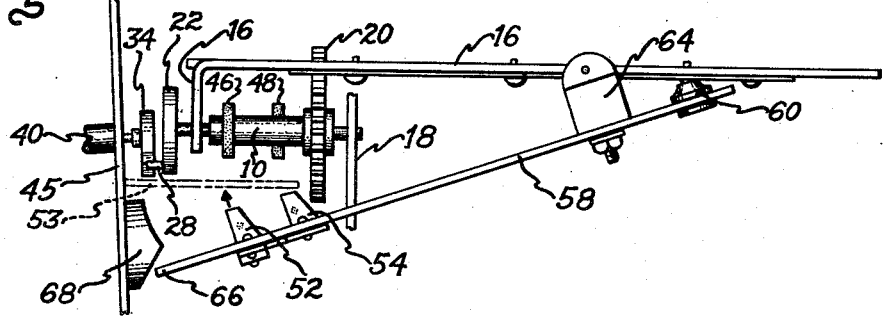
FIG. 2 is a side view of the form of invention shown in FIG. 1 with parts in section showing the resetting mechanism at its at rest position.
Figure 3:
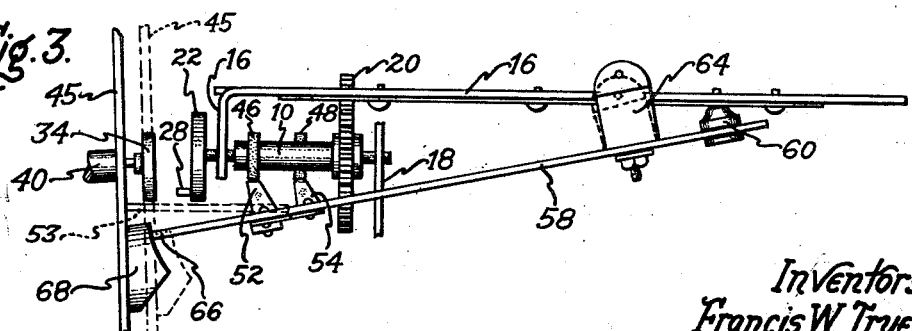
FIG. 3 is a side view similar to FIG. 2, but showing the resetting mechanism in its resetting position.

Referring now particularly to FIGS. 1, 2, and 3 of the drawing, the shaft resetting means of this invention is shown as applied to an indicating demand meter of the nature disclosed and claimed in the aforesaid Ham Patent No. 3,092,318. As shown in FIGS. 1 through 3, a plurality of rotatable shafts 10, 12, and 14, are rotatably mounted in fixed members 16 and 18. The shafts are rotated by means of gear members, only one of which is shown and is designated 20, mounted near one end of such shaft. The opposite ends of the shafts are provided with disc members 22, 24, and 26, with pin members 28, 30 and 32 being mounted on the respective discs. In the manner disclosed in the hereinbefore mentioned Ham patent, pin number 28 is a driving pin for driving the unit indicator of an indicating demand meter while pins 30 and 32 are tracking or following pins and in themselves do not drive. However, it will be understood that where desirable the pins 30 and 32 could also be driving pins. In front of each of the disc members 22, 24, and 26, is mounted a second disc member 34, 36 and 38, the discs 34, 36, and 38 being connected to rotatable shaft members 40, 42, and 44 respectively. The rotatable shaft members are rotatably mounted in a plate member 45 and are used to drive the units, tens and hundreds pointer, respectively, of an indicating demand register (the pointers not being shown).

In order to provide the desired resetting of the rotatable shafts 10, 12, and 14, each of the shafts is provided with a magnetic means 46, 48, and 50, mounted thereon. In the preferred form, the magnetic means 46, 48, and 50 are each shaped somewhat in the form of an ellipse, as shown, having flat ends which form the poles of the magnetic means. Each of the magnetic means is mounted on its respective rotatable shaft such that at the zero position one of the magnetic poles is at the lowermost vertical position in the manner more clearly shown in FIG. 5 of the drawing. It is desirable to stagger the magnetic means on the rotatable shafts such that the central magnetic means 48 on the rotatable shaft 12 is spaced from the plane containing the magnetic means 46 and 50 in the manner shown in FIG. 1 of the drawing. This is to prevent the adjacent rotating magnets from affecting each other during rotation of the shafts. By means of staggering, the air gap is increased between the magnetic means, thus reducing any possibility of the magnetic fields interfering with each other during rotation of the shafts. Further, in order to aid in the resetting of the shafts, the alternate rotating magnetic means 46, 48, and 50 are placed on the shaft such that opposite poles are in the lowermost vertical position during the predetermined position of the rotatable shaft. For example, when rotatable magnet 46 on rotatable shaft 10 has its south pole in the lowermost position to provide the predetermined setting of the rotatable shaft 10, then rotatable magnet 48 on rotatable shaft 12 will have its lowermost magnet pole a north pole while rotatable magnet 50 on rotatable shaft 14 will have its lowermost pole, also a south pole.

In order to provide the desired resetting of the shafts by means of the rotatable magnetic members 46, 48, and 50, fixed magnetic means 52, 54 and 56 are provided, fixedly mounted on a pivotable plate 58, which is pivoted about the fixed member 16 at the pivot points 60 and 62. The fixed magnetic members 52, 54, and 56 are mounted with the pole in the uppermost position being of opposite polarity to the lowermost pole of the rotating magnet when the rotatable shaft is in its fixed or predetermined position, as hereinbefore discussed. For example, when the lowermost pole of rotating magnet 46 is a south pole when rotatable shaft 10 is in its fixed or predetermined position, then the uppermost pole of the fixed magnetic member 52 will be a north pole. Similarly, of course, the uppermost pole of magnet 54 would be a south pole while the uppermost pole of magnetic member 56 would be a north pole. As indicated, the fixed magnetic members are also staggered.

As shown, particularly in FIGS. 2 and 3, a plate member 64 is provided attached to the pivot plate 58 which is connected to the timing motor of the indicating demand meter (not shown) which provides for a pivoting of the plate 58 in an upward direction during the resetting interval of the indicating demand meter. As disclosed in the hereinbefore mentioned Ham patent, when the pivot plate 58 is raised during the resetting interval of the demand meter, the forward portion 66 of the pivot plate 58 contacts the cam member 68 on the support member 45, forcing the plate 45 forward, and with it the discs 34, 36, 38 and their rotatable shafts, 40, 42, and 44, thus freeing rotatable shafts 10, 12, and 14 for resetting. In the manner shown in FIGS. 4 and 5, as the pivotal plate 58 is pivoted upwardly to bring the magnets 52, 54, and 56 into proximity to the rotatable magnets 46, 48, and 50, the magnetic attraction between the poles on the fixed magnets and the poles on the rotatable magnets will cause the unlike poles to be attracted to each other in a manner well known to those skilled in the art. For example, as shown in FIG. 4, when the fixed magnet 52, having a north pole in its uppermost position, is brought into proximity to the rotatable magnet 46, the magnetic attraction between the north pole of fixed magnet 52 and the south pole of rotatable magnet 46 will cause the rotatable magnet 46 to be drawn down towards the fixed magnet such that the south pole will be directly opposite the north pole of the fixed magnet. The final result of the attraction between these two magnetic means is clearly shown in FIG. 5 where it can be seen at the topmost movement of the pivotal plate 58 that magnet 52 is in close proximity to the rotatable magnet 46 and the south pole of the rotatable magnet 46 is in the lowermost position as close as possible to the north pole of the fixed magnet 52. Of course, inasmuch as the rotatable magnet 46 is firmly fixed to the rotatable shaft 10, the rotatable shaft 10 will be rotated to the desired fixed or predetermined position which, as hereinbefore discussed, has been preset with the south pole in its lowermost vertical position as shown in FIG. 5.

In order to prevent the fixed magnets 52, 54, and 56 from placing a drag on the rotating shafts 10, 12 and 14 during the running of the meter, a shielding device may be placed between the fixed magnets and the rotating magnets 46, 48, and 50. One form of a shield which may be used for this purpose is shown in phantom view in FIGS. 1-3. In FIG. 1, a shield means 53 is shown, mounted between the fixed magnets 52, 54, and 56 and the rotating magnets 46, 48 and 50. As more clearly shown in FIGS. 2 and 3, the shield means 53 is mounted on the plate 45, and moves with the plate 45 during the resetting of rotatable shafts 10, 12 and 14. It is preferred that the shielding device 53 be provided with slots such as slots 55 and 57 to provide means for the fixed magnets 52 and 56 to extend through the shield 53 during reset. As will be understood, due to the staggered position of fixed magnet 54, it will be free to move into proximity to rotatable magnet 48, when plate 45 moves forward, as can be clearly seen in FIGS. 2 and 3 of the drawing. From the above, it can be seen that a shielding device may be provided which will prevent the field from the fixed magnets from placing a drag on the rotatable shafts through action on the rotatable magnets. Further, during resetting of the rotatable shafts, the shield means is moved away from the area between the magnets to allow the fixed magnets to be brought into proximity to the rotatable magnets to perform the desired resetting function.

A return path for the magnetic fields from the fixed magnets 52, 54 and 56 may be provided by making the portion 58' of the pivot plate 58 of magnetic material. As will be understood by those skilled in the art, the magnetic material of member 58' also functions as an external shielding means, to minimize the influence of external magnetic fields on the magnets.

From the above discussion it will be obvious that there has been described a resetting mechanism utilizing fixed and rotatable magnets to reset rotatable shafts regardless of the amount of rotation through which such shafts have been driven. Of course, it will be obvious that while there has been shown the movement of the disc members 34, 36, and 38 in a forward direction away from the driving discs 22, 24, and 26 that an alternative construction would be to provide means for causing the rotatable shafts 10, 12, and 14 and their discs 22, 24, and 26 to be shifted rearward to provide the desired driving clearance between the discs 22, 24, 26 and the discs 34, 36 and 38. Obviously, one advantage which would be obtained by shifting the rotatable shafts backward during the resetting of the shafts would be to provide a moment of movement to the shafts which would aid in preventing any possibility of the shafts sticking at the 180° point, that is where the like poles of the fixed and rotatable magnets were directly opposite each other. However, by means of the staggered magnets with the staggered poles, as discussed, and by pivoting such magnets into position on an arcuate path, the attraction of the magnetic field of the fixed magnets and rotatable magnets is started at an angle such that the possibility of the shafts sticking at the 180° point is substantially eliminated.

Referring now to FIGS. 6 and 7 of the drawing, a second embodiment of the invention is shown. In this embodiment of the invention, a pair of rotatable shafts 72 and 74 are provided with magnetic means 76 and 78 for resetting of the shafts to a fixed or predetermined position. As mentioned with reference to the first embodiment, the magnets 76 and 78 are fixedly mounted on shafts 72 and 74 in such manner that one of their poles is in a predetermined position when the shafts are at the fixed or predetermined position desired for reset. Mounted adjacent the shafts 72 and 74 is a shaft member 80 provided with a pair of magnetic means 82 and 84 which are fixed to the shaft 80 and rotatable therewith. Magnetic shielding means 86 and 88 are provided about the rotatable magnets 82 and 84 so as to shield such magnets and prevent their magnetic field with interfering with the rotation of the rotatable magnets 76 and 78 during the period when the shafts 72 and 74 are being rotated. As shown, the desired reset position of the shafts 72 and 74 will be fixed such that the south pole of magnet 76 and the north pole of magnet 78 are closest to the resetting magnets 82 and 84. Thus at reset the shaft 80 is rotated so that the north pole of magnet 82 and the south pole of magnet 84 are revolved so that such poles are in close proximity to the magnets 76 and 78. As will be apparent, the magnetic attraction field generated by the north pole of magnet 82 on the magnet means 76 will cause magnetic means 76 to rotate so that its south pole comes opposite the north pole of magnet 82. Obviously, the rotation of the magnet 76 will also rotate shaft member 72 to its desired zero position. In the same manner, the south pole of magnet 84 will attract the north pole of magnet 78 thereby causing the magnet to rotate until the north pole is directly opposite the south pole, thus also rotating shaft 74 to its fixed or predetermined position. In FIG. 7 the magnetic means 82 is shown in the shape of an ellipse, being shown in full lines in its resetting position where the north pole is directly opposite the magnetic means 76 and being shown in dotted lines in the rest or non-reset position, when the north and south poles are in a horizontal line and both poles are completely within the magnetic shielding member 86. Of course, it will be obvious that the magnets 76 and 78 and 82, 84 may be of any shape desired. One is shown in FIG. 7 as being of an elliptical shape to more clearly show the resetting position and the non-resetting position of the magnet 82 within the shield member 86.

From the above, it will be obvious that there has been disclosed herein a resetting mechanism for resetting rotatable shafts through the use of magnetic means which may be utilized to reset one, or a plurality of, rotating shaft members to a fixed or predetermined position regardless of the number of rotations through which such rotatable member or members may have been moved. It will also be apparent that by means of this invention the resetting of such rotatable shaft or shafts is very accurately accomplished by means of such resetting mechanism. While there has been shown and described herein the present preferred embodiments of this invention as required by the patent statutes, it will be obvious to those skilled in the art that various changes may be made in the operation or in the structural design of the various embodiments of this invention without departing from the spirit and scope of the invention as set forth in the appended claims.

What is claimed as new and which it is desired to secure by Letters Patent of the United States is:

1. A resetting mechanism for resetting a rotatable shaft to a predetermined position comprising, a rotatable shaft rotatable through a plurality of revolutions, a first magnetic means mounted on said shaft for rotation therewith, said first magnetic means being mounted with one magnetic pole in a first position when said shaft is in its predetermined position, a second magnetic means, means movably mounting said second magnetic means so as to move its pole of opposite polarity to said one pole into a position adjacent said first magnetic means, whereby said pole of opposite polarity attracts said one pole of said first magnetic means, moving said one pole to said first position, thereby rotating said shaft to said predetermined position.

2. A resetting mechanism as claimed in claim 1 in which said means movably mounting said second magnetic means is a pivoted plate.

3. A resetting mechanism as claimed in claim 1 in which said means movably mounting said second magnetic means is a rotatable shaft.

4. A resetting mechanism for resetting rotatable shafts to a predetermined position comprising, a plurality of rotatable shafts rotatable through a plurality of revolutions, a plurality of first magnetic means, each of said first magnetic means being fixedly mounted on one of said plurality of rotatable shafts, each of said first magnetic means being mounted such that one magnetic pole is in a first position when the shaft on which it is mounted is in its predetermined position, a plurality of second magnetic means, means movably mounting said second magnetic means to move a magnetic pole of opposite polarity to said one magnetic pole of each of said first magnetic means to a position adjacent each of said first magnetic means, whereby each said pole of opposite polarity attracts one of said one magnetic poles to move each of said first magnetic means to said first position thereby rotating said shafts to said predetermined position.

5. A resetting mechanism for resetting rotatable shafts to a predetermined position comprising, a plurality of rotatable shafts rotatable through a plurality of revolutions, a plurality of first magnetic means, one of said plurality of first magnetic means being fixedly mounted on each of said plurality of rotatable shafts with one magnetic pole of each of said plurality of first magnetic means in a first position when each of said plurality of rotatable shafts are in a predetermined position, a plurality of second magnetic means, a pivotal plate, said pivotal plate movable to a position adjacent said first position of said one magnetic pole of each of said plurality of first magnetic means, said plurality of second magnetic means mounted on said pivotal plate with a magnetic pole of like polarity to said one magnetic pole secured to said pivotal plate, whereby when said pivotal plate is moved to said position adjacent said first position of said one magnetic pole of each of said plurality of first magnetic means, the magnetic poles of said plurality of second magnetic means of opposite polarity to said one magnetic pole of each of said plurality of first magnetic means will be nearest said plurality of first magnetic means to thereby attract said one magnetic pole of each of said plurality of first magnetic means, moving said one pole to said first position and causing said rotatable shafts to be reset to said predetermined position.

References Cited in the file of this patent

UNITED STATES PATENTS

| | | |
|---|---|---|
| 1,600,319 | Cox | Sept. 21, 1926 |
| 1,957,543 | Kenerson | May 8, 1934 |
| 2,378,129 | Chambers | June 12, 1945 |
| 2,414,688 | Chambers | Jan. 21, 1947 |
| 2,420,607 | Mendelsohn | May 13, 1947 |
| 2,481,360 | Sprenger | Sept. 6, 1949 |
| 2,525,443 | Bischoff | Oct. 10, 1950 |
| 2,546,729 | Millar | Mar. 27, 1951 |
| 3,045,903 | Fleming | July 24, 1962 |

FOREIGN PATENTS

| | | |
|---|---|---|
| 558,185 | Germany | Sept. 3, 1932 |
| 842,135 | Germany | June 23, 1952 |
| 486,542 | Great Britain | June 7, 1938 |